(12) United States Patent
Akiyama et al.

(10) Patent No.: US 9,360,855 B2
(45) Date of Patent: Jun. 7, 2016

(54) ANOMALY DETECTION SYSTEM FOR DETECTING ANOMALY IN MULTIPLE CONTROL SYSTEMS

(75) Inventors: Kazuhito Akiyama, Tokyo (JP); Michiharu Kudo, Tokyo (JP); Naohiko Uramoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 429 days.

(21) Appl. No.: 14/117,278

(22) PCT Filed: May 8, 2012

(86) PCT No.: PCT/JP2012/061770
§ 371 (c)(1),
(2), (4) Date: Nov. 12, 2013

(87) PCT Pub. No.: WO2012/157471
PCT Pub. Date: Nov. 22, 2012

(65) Prior Publication Data
US 2015/0293516 A1 Oct. 15, 2015

(30) Foreign Application Priority Data

May 13, 2011 (JP) .................................. 2011-108651

(51) Int. Cl.
*G05B 19/05* (2006.01)
*G05B 23/02* (2006.01)
(52) U.S. Cl.
CPC .......... *G05B 19/058* (2013.01); *G05B 23/0221* (2013.01); *G05B 2219/14036* (2013.01)
(58) Field of Classification Search
CPC ............. G05B 19/058; G05B 23/0221; G05B 2219/14036
See application file for complete search history.

(56) References Cited

U.S. PATENT DOCUMENTS 4,535,456 A * 8/1985 Bauer .................. G05B 19/058
700/12
4,843,557 A * 6/1989 Ina ..................... G05B 23/0251
340/459

(Continued)

FOREIGN PATENT DOCUMENTS

CN 101208589 A 6/2008
CN 101344783 A 1/2009

(Continued)

OTHER PUBLICATIONS

Patents Act 1977 Examination Report under Section 18(4), dated Jul. 28, 2014, Application No. GB1320978.8, 1 page.

(Continued)

*Primary Examiner* — Ramesh Patel
(74) *Attorney, Agent, or Firm* — Mark G. Edwards; Jennifer R. Davis

(57) ABSTRACT

An anomaly detection system for detecting an anomaly in a plurality of control systems comprises a plurality of analysis devices that are associated with the respective control systems and that acquire an event occurring in an associated control system and analyze the event to determine whether there is an anomaly. A first analysis device among the plurality of analysis devices determines whether an event occurring in the associated control system is to be indicated to a second analysis device among the plurality of analysis devices, and the second analysis device determines that there is an anomaly on condition that the event indicated by the first analysis device has correlation with an event indicated by an analysis device other than the first analysis device.

14 Claims, 6 Drawing Sheets

(56) References Cited

U.S. PATENT DOCUMENTS

| | | | |
|---|---|---|---|
| 5,680,541 A | 10/1997 | Kurosu et al. | |
| 5,875,431 A * | 2/1999 | Heckman | G06Q 10/04 705/7.16 |
| 6,347,374 B1 * | 2/2002 | Drake | G06F 21/554 709/224 |
| 6,405,318 B1 * | 6/2002 | Rowland | G06F 21/552 726/22 |
| 7,539,549 B1 * | 5/2009 | Discenzo | F04D 15/0077 324/765.01 |
| 7,539,593 B2 | 5/2009 | Machacek | |
| 7,729,876 B2 | 6/2010 | Milanovic et al. | |
| 8,090,592 B1 * | 1/2012 | Goodall | G06Q 10/063 705/2 |
| 8,284,254 B2 * | 10/2012 | Romanowich | G08B 13/19608 348/143 |
| 8,744,124 B2 * | 6/2014 | Venkatesh | G06K 9/00771 382/103 |
| 2003/0088381 A1 | 5/2003 | Henry et al. | |
| 2008/0103629 A1 | 5/2008 | Milanovic et al. | |
| 2008/0270162 A1 | 10/2008 | Machacek | |
| 2010/0185316 A1 * | 7/2010 | Yamada | G05B 19/4142 700/189 |
| 2011/0057812 A1 | 3/2011 | Matsuda et al. | |
| 2013/0245793 A1 * | 9/2013 | Akiyama | G06F 21/554 700/79 |

FOREIGN PATENT DOCUMENTS

| | | |
|---|---|---|
| CN | 102047192 A | 5/2011 |
| CN | 102047192 A | 5/2011 |
| JP | 05-164802 A | 6/1993 |
| JP | 05164802 A | 6/1993 |
| JP | 2002526018 A | 8/2002 |
| JP | 2005149006 A | 6/2005 |
| JP | 2006331372 A | 12/2006 |
| JP | 2007-506353 A | 3/2007 |
| JP | 4160799 B2 | 10/2008 |
| JP | 4221994 B2 | 2/2009 |
| JP | 4310648 B2 | 8/2009 |
| JP | 2009-199246 A | 9/2009 |
| JP | 4334176 B2 | 9/2009 |
| JP | 2009199246 A | 9/2009 |
| JP | 4363244 B2 | 11/2009 |
| JP | 4534719 B2 | 9/2010 |
| JP | 2010231422 A | 10/2010 |
| WO | 2009044820 A1 | 12/2009 |
| WO | WO 2009/144820 A1 | 11/2013 |

OTHER PUBLICATIONS

"SCADA", Wikipedia, http://ja.wikipedia.org/wiki/SCADA, last printed Oct. 2, 2013.

"SCADA", Wikipedia, the free encyclopedia, http://en.wikipedia.org/wiki/SCADA, last printed Oct. 2, 2013.

Search Report PCT/JP2012/061770.

* cited by examiner

Figure 5

| ADDITIONAL INFORMATION ||
|---|---|
| INTERNAL NAME | CONCEALING CODE |
| BACKYARD #1 | 39485 |
| BACKYARD #2 | 13456 |
| MAIN DOOR #1 | 27321 |
| MAIN DOOR #2 | 53884 |

ANOMALY DETECTION SYSTEM FOR DETECTING ANOMALY IN MULTIPLE CONTROL SYSTEMS

TECHNICAL FIELD

The present invention relates to an anomaly detection system for detecting an anomaly in multiple control systems.

BACKGROUND ART

Industrial control systems (ICS) are known that manage and control industrial and infrastructure systems (see Non-Patent Literature 1, for example). Many of conventional industrial control systems are not connected with an external network and operate with specific protocols. Recent industrial control systems, however, are increasingly connected with an external network through a generic protocol, such as the Internet protocol. This enables multiple industrial control systems to cooperate with each other.

[Patent Literature 1] National Publication of International Patent Application No. 2007-506353

[Non-Patent Literature 1] "SCADA", (online), Wikipedia, (searched on Mar. 30, 2011), the Internet, URL: http://ja.wikipedia.org/wiki/SCADA

SUMMARY OF INVENTION

Problem to be Solved by the Invention

Industrial control systems continuously monitor their internal devices or the like for anomalies; however, multiple industrial control systems have not been cooperatively monitoring an anomaly.

Means for Solving the Problem

To solve the problem, a first aspect of the invention provides an anomaly detection system for detecting an anomaly in a plurality of control systems, the anomaly detection system comprising a plurality of analysis devices that are associated with the respective control systems and that acquire an event occurring in an associated control system and analyze the event to determine whether there is an anomaly, wherein a first analysis device among the plurality of analysis devices determines whether an event occurring in the associated control system is to be indicated to a second analysis device among the plurality of analysis devices; and the second analysis device determines that there is an anomaly on condition that the event indicated by the first analysis device has correlation with an event indicated by an analysis device other than the first analysis device. A method and a program for the system are also provided.

The summary of the invention does not list all of the essential features of the invention. A subcombination of such features may also be within an invention.

BRIEF DESCRIPTION OF THE DRAWINGS

FIG. 5 shows an example of a table used for concealing additional information.

MODE FOR CARRYING OUT THE INVENTION

While the present invention is described below with reference to its embodiment, the embodiment is not intended to limit the claimed invention. Also, not all combinations of the features set forth in the embodiment are essential for the solution of the invention.

Figure 1:
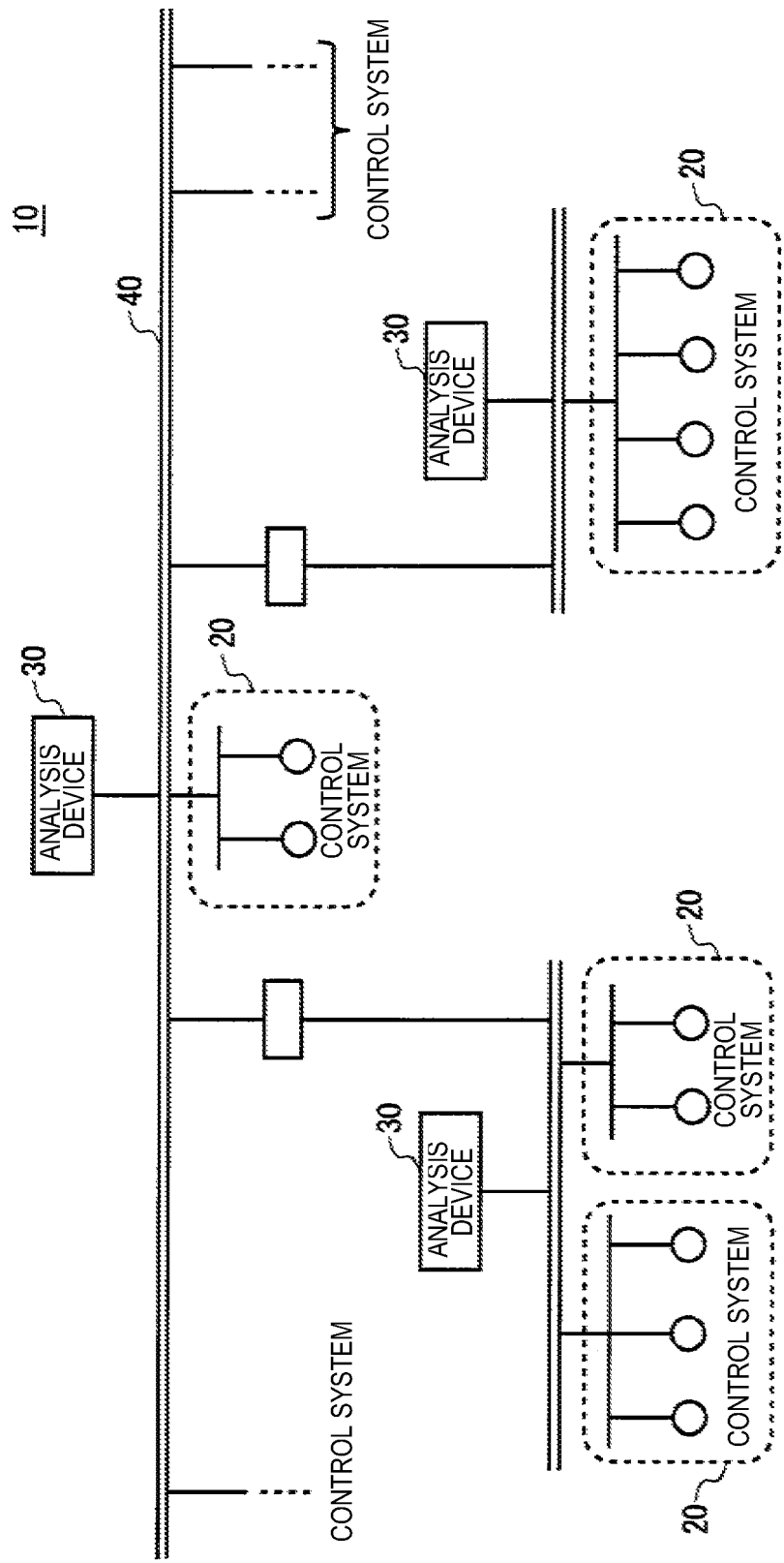
FIG. 1 shows a configuration of a computing system 10 according to an embodiment of the invention.

FIG. 1 shows a configuration of a computing system 10 according to an embodiment. The computing system 10 of the embodiment includes multiple control systems 20, multiple analysis devices 30, and a network 40.

Each of the control systems 20 is a system constituted by multiple interconnected computers and devices. The control systems 20 each may be an industrial control system (ICS) for managing and controlling objects of an industry or infrastructure (e.g., traffic, energy) system, for example. In this case, the control systems 20 have multiple devices, a programmable logic controller (PLC) to control the devices, a server and the like.

The control systems 20 may each be a system to manage various devices connected to a network within a building (e.g., a system for electricity, gas, water, air conditioning, or security), for example. Each of the control systems 20 may also be a partial system of a large control system. For example, the control systems 20 may each be a partial management system constituting a system that is responsible for managing a whole city (e.g., a system for managing buildings, plants, water supply, electricity, etc.).

The control systems 20 may also be systems for managing various devices (e.g., telephones, copiers) connected with an office or house network, for example. The control systems 20 may also be systems for managing computers connected with a network within a corporation or the like, or systems for managing a large number of servers connected with a network of a data center or the like.

The analysis devices 30 are respectively associated with the control systems 20. Each of analysis devices 30 may be associated with one, or two or more control systems 20. The analysis devices 30 each acquire events that occur in the associated control system(s) 20 and analyze the events to determine whether there is an anomaly in the control system(s) 20.

An event refers to an incident that occurs in an associated one of the control systems 20 and that can be detected by a sensor or a computer, for example. For example, an event may be a physical amount (such as electricity, temperature, humidity, mass, volume, and flow rate) detected by a sensor provided for a device or the like within the control system 20. An event may also be a measurement of data that is input and output to and from an information processor or the like within the control system 20 (e.g., data rate, response to data transmission and reception, and error rate), for example. An event may also be the state of a device in the control system 20 (e.g., operating/non-operating, and operation mode), or the state of resources constituting the information processor in the control system 20 (e.g., memory usage, processor utilization).

Each of the analysis devices 30 acquires events occurring in the associated control system 20 and determines whether a predefined event is acquired. When a predefined event is acquired, each of the analysis devices 30 determines that there is an anomaly in the associated control system 20. Upon determining that the associated control system 20 has an anomaly, the analysis device 30 carries out processing for handling the anomaly.

The network 40 connects between the control systems 20 and analysis devices 30 to enable data transmission and reception therebetween. The network 40 transmits data according to a generic protocol, e.g., the Internet protocol.

Figure 2:
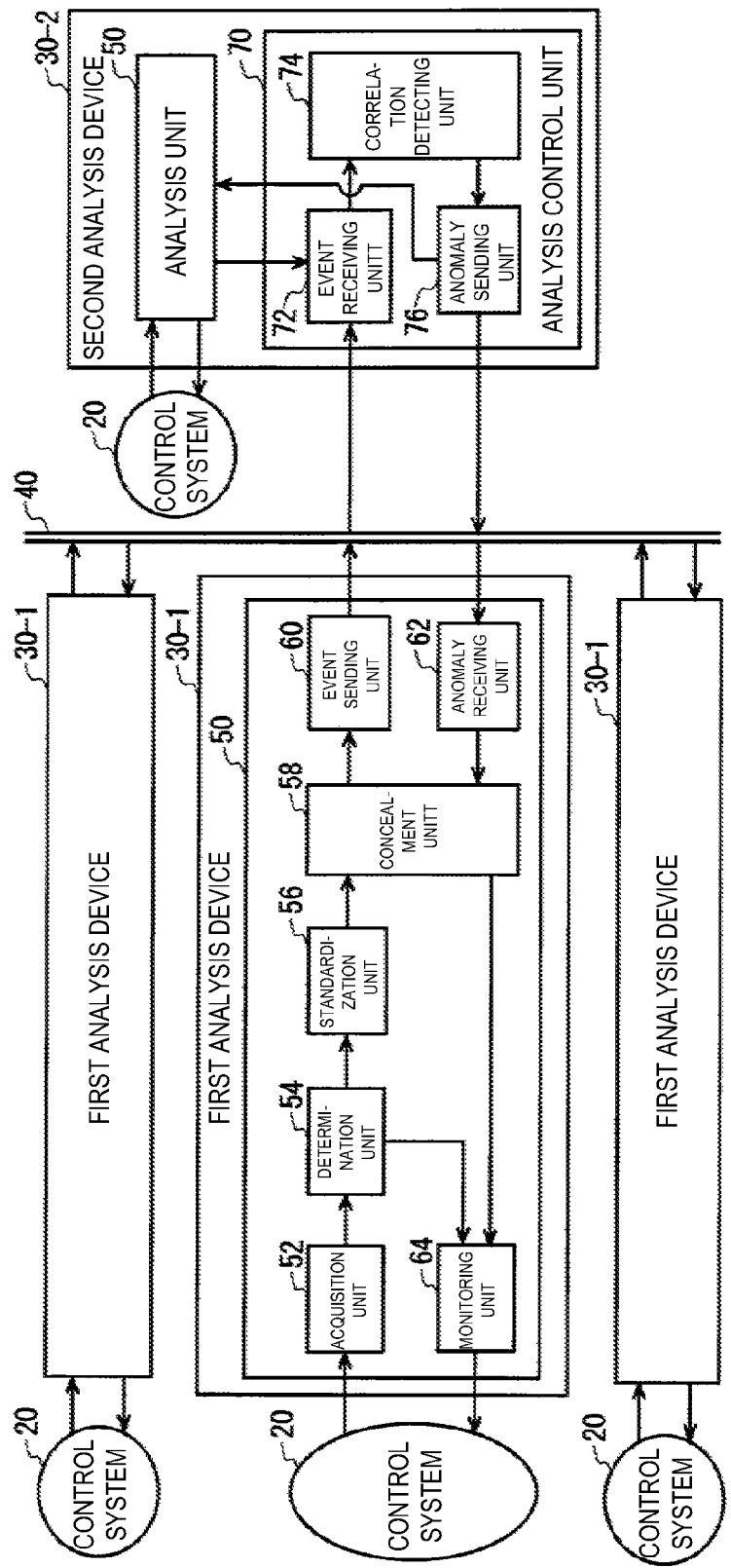
FIG. 2 shows a configuration of a first analysis device 30-1 and a second analysis device 30-2 according to the embodiment.

FIG. 2 shows a configuration of a first analysis device 30-1 and a second analysis device 30-2 according to the present embodiment. The analysis devices 30 in the computing system 10 according to the present embodiment cooperate with each other to function as an anomaly detection system for detecting anomalies in the control systems 20.

More specifically, the first analysis device 30-1 among the analysis devices 30 indicates an event acquired from the associated control system 20 to the second analysis device 30-2 among the analysis devices 30. The second analysis device 30-2 then determines whether there is correlation between the event from the first analysis device 30-1 and one from an analysis device 30 other than the first analysis device 30-1, and determines that there is an anomaly if they have correlation.

In the present embodiment, at least one of the analysis devices 30 included in the computing system 10 serves as the second analysis device 30-2. The other analysis devices 30 than the second analysis device 30-2 function as the first analysis devices 30-1.

The first analysis device 30-1 includes at least an analysis unit 50 that acquires events occurring in the associated control system 20 and analyzes the events to determine whether the control system has an anomaly. The second analysis device 30-2 includes at least an analysis control unit 70 that determines whether there is an anomaly in any of the control systems 20. The second analysis device 30-2 may further include the analysis unit 50.

The analysis unit 50 includes an acquisition unit 52, a determination unit 54, a standardization unit 56, a concealment unit 58, an event sending unit 60, an anomaly receiving unit 62, and a monitoring unit 64. The analysis control unit 70 includes an event receiving unit 72, a correlation detecting unit 74, and an anomaly sending unit 76.

The acquisition unit 52 acquires events occurring in the associated control system 20. For example, the acquisition unit 52 acquires physical amounts (such as electricity, temperature, humidity, mass, volume, and flow rate) detected by physical sensors located at certain points within the control systems 20 as events. The acquisition unit 52 may also acquire measurements of data that is input and output to and from an information processor or the like within the control system 20 (e.g., data rate, response to data transmission and reception, and error rate) as events, for example. The acquisition unit 52 may also acquire the state of devices within the control system 20 or the state of resources constituting the information processor in the control system 20 (e.g., usage of memory, processor utilization) as events.

The determination unit 54 determines whether the associated control system 20 has an anomaly or not based on an acquired event. For example, the determination unit 54 determines whether an acquired event has a predetermined value.

For example, the determination unit 54 determines that the associated control system 20 has an anomaly when a physical amount detected by a sensor falls outside a predetermined normal range. The determination unit 54 may also determine that the associated control system 20 has an anomaly if a measurement of data input and output to and from an information processor in the control system 20 falls outside a predetermined normal range, for example. The determination unit 54 may also determine that the associated control system 20 has an anomaly if a device in the control system 20 or a resource constituting the information processor in the control system 20 is in a predetermined state, for example.

When the determination unit 54 determines that the associated control system 20 has an anomaly, it notifies the monitoring unit 64 of the anomaly. Upon being notified of the anomaly by the determination unit 54, the monitoring unit 64 performs a handling process that should be done when there is an anomaly. For example, the monitoring unit 64 reports the anomaly to an administrator of the associated control system 20. The monitoring unit 64 may also increase the frequency of monitoring the associated control system 20, for example. In this case, the monitoring unit 64 increases the frequency of event acquisition at the acquisition unit 52, for example. The monitoring unit 64 may also deactivate the anomalous device or shut off power supply to it.

The determination unit 54 further determines whether or not to indicate events occurring in the associated control system 20 to the second analysis device 30-2 even if the associated control system 20 is determined not to be anomalous. In the present embodiment, the determination unit 54 determines that an event acquired should be indicated to the second analysis device 30-2 if the event has a value that is not determined as anomalous and if the difference between the value and a threshold of anomaly determination is within a predetermined range. The determination unit 54 may also determine that an event with which the associated control system 20 is determined as anomalous should also be indicated to the second analysis device 30-2.

As an example, the determination unit 54 determines that an event should be indicated to the second analysis device 30-2 if a physical amount detected by a sensor or a measurement of data that is input and output to and from an information processor in the control system 20 falls within a predetermined normal range (a range in which the associated system is determined to be normal) and if the difference between the value and a threshold of anomaly determination is within a predetermined range. As another example, the determination unit 54 determines that an event should be indicated to the second analysis device 30-2 if a device in the control system 20 or a resource constituting the information processor in the control system 20 is in a state with which the control system 20 is determined to be normal and also in a predefined state.

The standardization unit 56 standardizes the data format for an event that occurred in the associated control system 20 and has been determined to be indicated to the second analysis device 30-2 at the determination unit 54. More specifically, the standardization unit 56 standardizes an event that has been determined to be indicated to the second analysis device 30-2 by converting the data format of the event into a data format for the second analysis device 30-2. The standardization unit 56 may also convert the data format of an event that occurred in the associated control system 20 into a standard data format for the multiple control systems 20 to standardize the event, for example. The standardization unit 56 can thereby convert an event to be indicated to the second analysis device 30-2 into a data format that is readable by the second analysis device 30-2.

The concealment unit 58 conceals part of data describing an event occurring in the associated control system 20 that has been determined by the determination unit 54 to be indicated to the second analysis device 30-2. By way of example, the concealment unit 58 conceals a portion of data describing an event that should not be revealed to other analysis devices 30. For example, the concealment unit 58 conceals data that represents a matter that should not be revealed to the administrators of the other control systems 20 for ensuring security (e.g., the installation location and performance of a sensor).

The event sending unit 60 sends an event in the associated control system 20 that has been standardized by the standardization unit 56 and a part of data of which has been concealed by the concealment unit 58 to the analysis control unit 70 of the second analysis device 30-2. The analysis unit 50 of the first analysis device 30-1 converts the event into a message and sends it to the analysis control unit 70 of the second analysis device 30-2 over the network 40. The analysis unit 50 of the second analysis device 30-2 may indicate an event to the analysis control unit 70 via or without via the network 40.

The event receiving unit 72 of the analysis control unit 70 receives events sent from the analysis devices 30. More specifically, the event receiving unit 72 receives events sent from the analysis unit 50 of the first analysis device 30-1 and events sent from the analysis unit 50 of the second analysis device 30-2.

The correlation detecting unit 74 of the analysis control unit 70 compares events sent from the analysis devices 30 with each other to determine whether the events have a correlation equal to or greater than a predetermined correlation value. The correlation detecting unit 74 determines that one of analysis devices 30 is anomalous if events sent from the analysis devices 30 have a correlation equal to a predetermined correlation value or greater, for example.

The anomaly sending unit 76 of the analysis control unit 70 indicates an anomaly to the analysis unit 50 of respective first analysis devices 30-1 and the analysis unit 50 of the second analysis device 30-2 if the correlation detecting unit 74 determines that there is an anomaly. In this case, the anomaly sending unit 76 provides, in anomaly information, data on a concealed portion included in an event that was sent from an analysis device 30 and that has been determined to have a correlation with an event sent from another analysis device 30 and be anomalous to the analysis unit 50 of the analysis devices 30.

The anomaly receiving unit 62 receives the anomaly information sent by the analysis control unit 70 of the second analysis device 30-2. The anomaly receiving unit 62 transfers the anomaly information to the concealment unit 58.

The concealment unit 58 clears the concealment of the concealed data portion included in the anomaly information. The concealment unit 58 transfers the anomaly information and the unconcealed data to the monitoring unit 64.

In response to indication of anomaly information from the analysis control unit 70 of the second analysis device 30-2, the monitoring unit 64 identifies the specifics of the anomaly indicated from the second analysis device 30-2. For example, when the concealment unit 58 indicates an event with the installation location of a sensor concealed, the monitoring unit 64 detects the installation location of the sensor from the unconcealed data. This allows the concealment unit 58 to locate the sensor that caused an event that has been determined by the second analysis device 30-2 to be anomalous. The monitoring unit 64 then carries out a handling process that should be done in the event of an anomaly.

Figure 3:
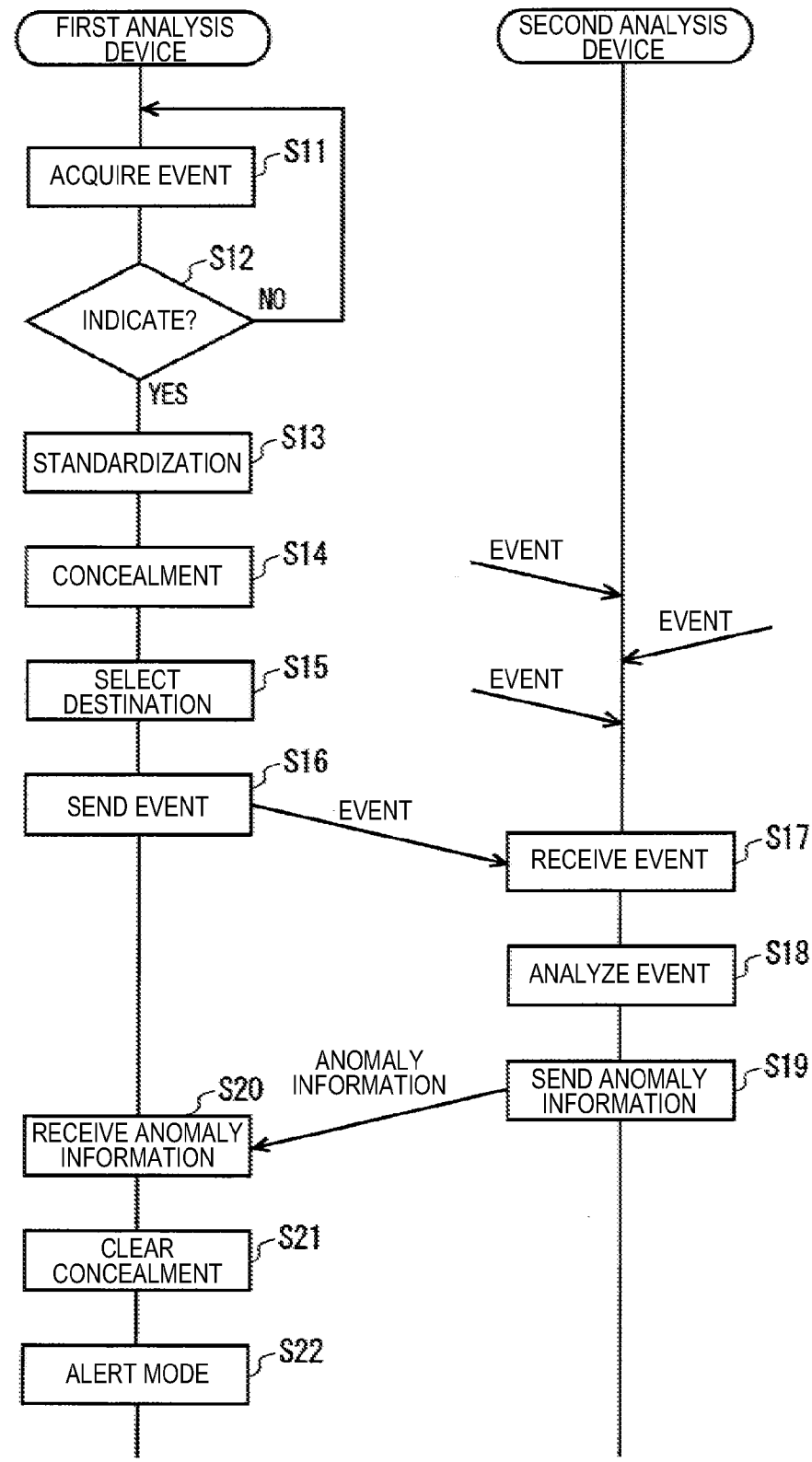
FIG. 3 shows a process flow of the first analysis device 30-1 and second analysis device 30-2 according to the embodiment.
Figure 4:
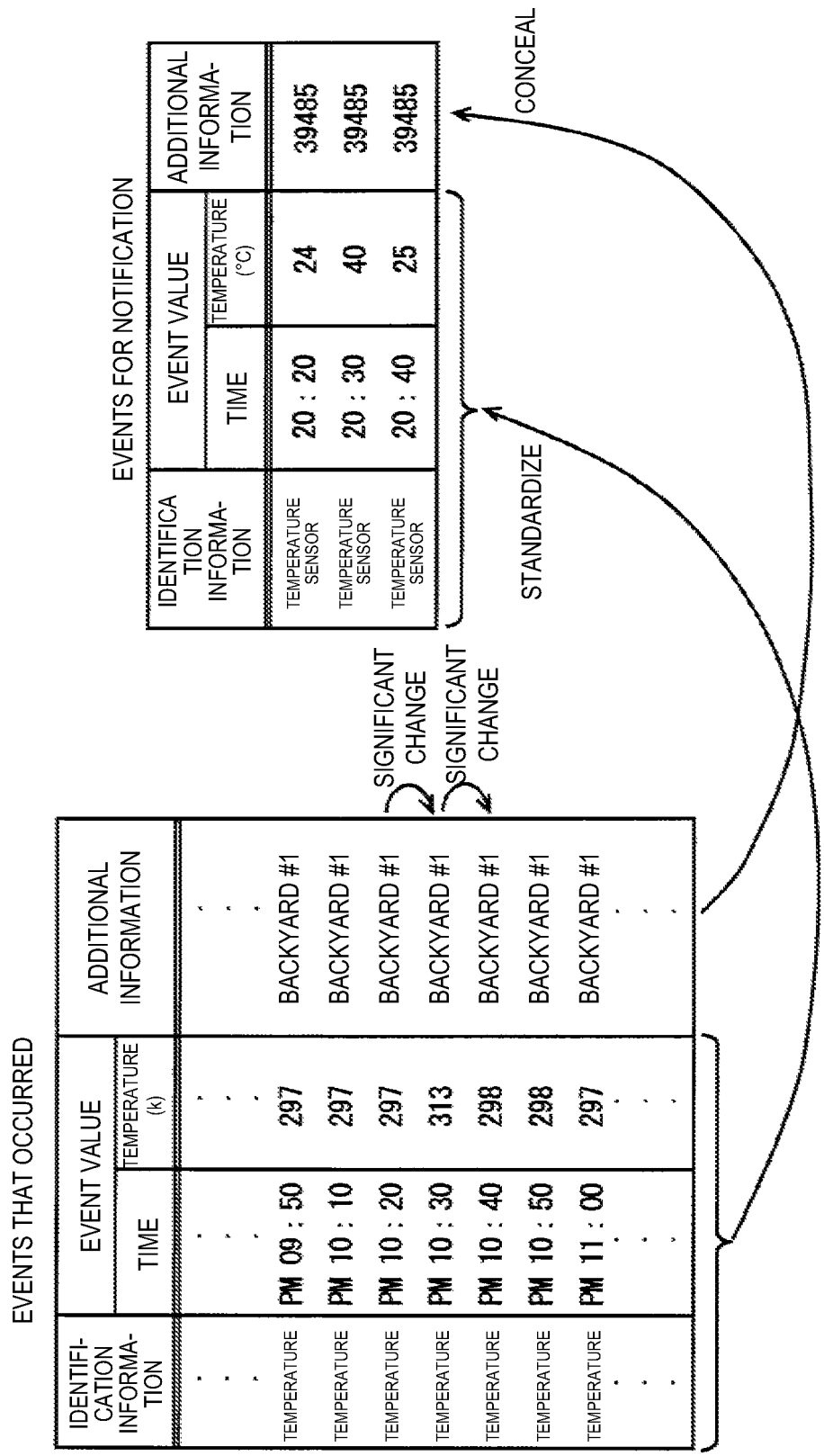
FIG. 4 shows an example of events acquired by the first analysis device 30-1 and an example of events sent by the first analysis device 30-1.

FIG. 3 shows a process flow between the first analysis device 30-1 and the second analysis device 30-2 according to the present embodiment. FIG. 4 shows an example of events acquired by the first analysis device 30-1 and an example of events sent by the first analysis device 30-1. FIG. 5 shows an example of a table used for concealing additional information.

First at step S11, the first analysis device 30-1 acquires events that occur in the associated control system 20 at certain time intervals. In the example of FIG. 4, the first analysis device 30-1 acquires the temperature of a device installed in the backyard of a building managed by the associated control system 20 as events every ten minutes.

Then at step S12, the first analysis device 30-1 determines whether or not to indicate each one of the events it regularly acquired to the second analysis device 30-2. As an example, the first analysis device 30-1 determines that the event should be indicated to the second analysis device 30-2 when a change in the event is greater than a predetermined amount of change.

In the example of FIG. 4, the first analysis device 30-1 determines that a temperature (an event) should be indicated to the second analysis device 30-2 if the temperature (an event) of the device in the backyard of the building managed by the associated control system 20 has changed by a predetermined amount or more in the last ten minutes. If the first analysis device 30-1 determines to indicate the event (S12: YES), the first analysis device 30-1 proceeds to step S13.

At step S13, the first analysis device 30-1 standardizes the data format of the event in question. By way of example, the first analysis device 30-1 converts identification information describing the event and an event value indicating the value of the event to a data format that is readable by the second analysis device 30-2 (e.g., a data format common in the computing system 10).

In the example of FIG. 4, the first analysis device 30-1 converts individual identification information represented as "temperature" to common identification information represented as "temperature sensor". Also in the example of FIG. 4, the first analysis device 30-1 converts "time" represented in 12-hour format (an individual event value) into "time" represented in 24-hour format (a common event value). In the example of FIG. 4, the first analysis device 30-1 also converts "temperature" represented in Fahrenheit (an individual event value) into "temperature" represented in Celsius (a common event value).

Then at step S14, the first analysis device 30-1 conceals a portion of data describing the event to be indicated that should not be revealed to other analysis devices 30 (e.g., data relating to security, data showing specific locations of event measurement). As an example, the first analysis device 30-1 conceals sensor position information, which is additional information on the event. In the example of FIG. 4, the first analysis device 30-1 conceals sensor position information represented as "backyard #1" into a random code "39485".

The first analysis device 30-1 also stores a conversion table showing the correspondence between unconcealed data and concealed data, for example, and conceals data with reference to the conversion table. In this example, the first analysis device 30-1 stores a conversion table for converting sensor position information representing sensor positions (backyard #1, backyard #2, main door #1, main door #2) into corresponding random codes (39485, 13456, 27321, 53884), such as the one shown in FIG. 5, for example.

At step S15, the first analysis device 30-1 selects at least one second analysis device 30-2 from the analysis devices 30 as the destination of event transmission. For example, when there are two or more analysis devices 30 that are able to receive events from multiple analysis devices 30 and determine whether an anomaly occurred, the first analysis device 30-1 selects one, or two or more analysis devices 30 as the second analysis device(s) 30-2 from those devices.

The first analysis device 30-1 may dynamically change the device selected for the second analysis device 30-2 from the analysis devices 30. For example, the first analysis device 30-1 designates the second analysis device 30-2 for each certain time period (e.g., a day, a week).

In this case, the first analysis device 30-1 may give a higher priority to an analysis device 30 with a short response time when selecting the second analysis device 30-2 from the analysis devices 30. This enables the first analysis device 30-1 to receive an indication of an anomaly faster. The first analysis device 30-1 may also select a new second analysis device 30-2 after event indication to the same second analysis device 30-2 has continued for a certain period or longer. The first analysis device 30-1 thereby can prevent one analysis device from fixedly being the second analysis device 30-2.

Then at step S16, the event that has been standardized at step S13 and concealed at step S14 is indicated to the second analysis device 30-2 selected at step S15. At step S17, the second analysis device 30-2 receives the event from the first analysis device 30-1.

At step S18, the second analysis device 30-2 detects correlation between events indicated from multiple analysis devices 30 and determines whether any of the control systems has an anomaly. More specifically, the second analysis device 30-2 determines that there is an anomaly if an event indicated from the first analysis device 30-1 has correlation with an event indicated from an analysis device 30 other than the first analysis device 30-1. By way of example, the second analysis device 30-2 determines that there is an anomaly if there is a correlation equal to or greater than a predetermined correlation value between a change in events indicated by the first analysis device 30-1 and a change in events indicated by an analysis device 30 other than the first analysis device 30-1.

For example, the correlation detecting unit 74 determines that there is an anomaly if temperatures from multiple temperature sensors respectively provided in control systems 20 have changed with a mutual correlation. In the example of FIG. 4, changes occur in a control system 20 including the temperature detected by a temperature sensor increasing between 20:20 and 20:30 and the temperature detected by the temperature sensor dropping between 20:30 and 20:40. In such a case, the second analysis device 30-2 determines an anomaly if a temperature sensor provided in the control systems 20 show a change in temperature similar to those shown in FIG. 4.

If the second analysis device 30-2 determines there is an anomaly at step S18, the second analysis device 30-2 then indicates the anomaly to the first analysis device 30-1 at step S19. In this case, the second analysis device 30-2 provides, in anomaly information, the analysis unit 50 with data on the concealed portion included in the event that was sent from the first analysis device 30-1 and that has been determined to be correlated with an event sent from another analysis device 30 and be anomalous.

Then at step S20, the first analysis device 30-1 receives the anomaly information sent from the second analysis device 30-2. At step S21, the first analysis device 30-1 identifies the specifics of the anomaly of the associated control system 20 from the anomaly information sent from the second analysis device 30-2.

The first analysis device 30-1 puts the concealed data portion in the anomaly information from the second analysis device 30-2 back into unconcealed data with reference to the conversion table. The first analysis device 30-1 then identifies the anomaly that occurred in the associated control system from the now unconcealed event. For example, the first analysis device 30-1 finds out that the anomaly occurred in the sensor in the backyard of the building with reference to such a conversion table as shown in FIG. 5.

At step S22, the first analysis device 30-1 changes a mode for controlling the associated control system 20 to an alert mode. The first analysis device 30-1 reports the anomaly to the administrator of the associated control system 20. The first analysis device 30-1 also increases the frequency of monitoring the associated control system 20, e.g., by increasing the frequency of event acquisition. The first analysis device 30-1 may also deactivate the anomalous device and/or shut off the power supply to it.

As described above, with the computing system 10 according to the present embodiment, an anomaly can be detected from occurrence of incidents or events having certain correlation with each other on multiple analysis devices 30 even if each one of the incidents or events is not detected as an anomaly in itself in a single control system 20. The computing system 10 therefore permits multiple analysis devices 30 to cooperate to detect an anomaly with higher accuracy and sensitivity.

The second analysis device 30-2 may request an unconcealed event from the first analysis device 30-1 when an event indicated from the first analysis device 30-1 has correlation with an event indicated from an analysis device 30 other than the first analysis device 30-1. In this case, the first analysis device 30-1 indicates an event without concealment to the second analysis device 30-2 in response to the request for an unconcealed event.

The second analysis device 30-2 then receives the unconcealed event from the first analysis device 30-1 and again determines whether there is correlation between the unconcealed event from the first analysis device 30-1 and the event from the analysis device 30 other than the first analysis device 30-1. If the events have correlation, the second analysis device 30-2 determines that there is an anomaly. The second analysis device 30-2 thus can determine occurrence of an anomaly more accurately.

Figure 6:
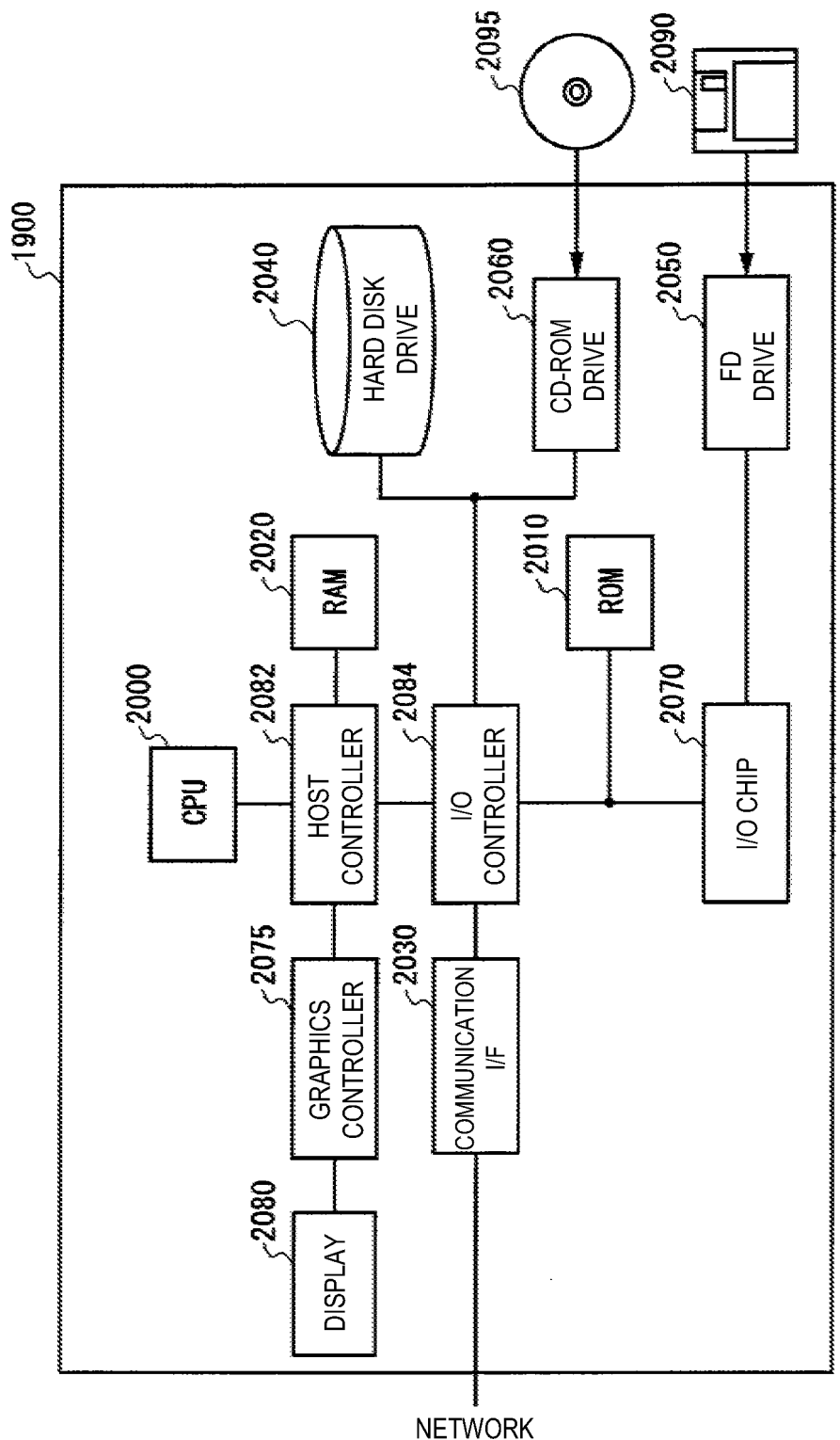
FIG. 6 shows an exemplary hardware configuration of a computer 1900 according to the embodiment.

FIG. 6 shows an exemplary hardware configuration of a computer 1900 according to the present embodiment. The computer 1900 according to the present embodiment includes a CPU peripheral portion having a CPU 2000, a RAM 2020, a graphics controller 2075, and a display device 2080, which are interconnected by a host controller 2082, an input/output portion having a communication interface 2030, a hard disk drive 2040, and a CD-ROM drive 2060, which are connected with the host controller 2082 through an input/output controller 2084, and a legacy input/output portion having a ROM 2010, a flexible disk drive 2050, and an input/output chip 2070, which are connected with the input/output controller 2084.

The host controller 2082 connects the RAM 2020 with the CPU 2000 and the graphics controller 2075, which access the RAM 2020 at a high transfer rate. The CPU 2000 operates according to programs stored in the ROM 2010 and RAM 2020 to control components. The graphics controller 2075 acquires image data generated by the CPU 2000 or the like in a frame buffer provided in the RAM 2020 and has it displayed on the display device 2080. Alternatively, the graphics controller 2075 may internally include a frame buffer for storing image data generated by the CPU 2000 or the like.

The input/output controller 2084 connects the host controller 2082 with the communication interface 2030, hard disk drive 2040, and CD-ROM drive 2060, which are relatively fast input/output devices. The communication interface 2030 communicates with other devices over a network. The hard disk drive 2040 stores programs and data that are used by the CPU 2000 of the computer 1900. The CD-ROM drive 2060 reads a program or data from the CD-ROM 2095 and supplies it to the hard disk drive 2040 via the RAM 2020.

The input/output controller 2084 is connected with the ROM 2010, and also with the flexible disk drive 2050 and the input/output chip 2070, which are relatively slow input/output devices. The ROM 2010 stores a boot program executed at start-up by the computer 1900 and/or programs that are dependent on the hardware of the computer 1900. The flexible disk drive 2050 reads a program or data from the flexible disk 2090 and supplies it to the hard disk drive 2040 via the RAM 2020. The input/output chip 2070 connects the flexible disk drive 2050 with the input/output controller 2084 and also connects various input/output devices with the input/output controller 2084 by way of a parallel port, serial port, keyboard port, or mouse port, for example.

Programs that are provided to the hard disk drive 2040 through the RAM 2020 are supplied by the user being stored in a recording medium such as the flexible disk 2090, CD-ROM 2095, or an IC card. The programs are read from the recording medium and installed in the hard disk drive 2040 in the computer 1900 via the RAM 2020 and executed at the CPU 2000.

Programs that are installed on the computer 1900 and cause the computer 1900 to function as the analysis unit 50 include an acquisition module, a determination module, a standardization module, a concealment module, an event sending module, an anomaly receiving module, and a monitoring module. These programs or modules operate on the CPU 2000 and the like to cause the computer 1900 to function as the acquisition unit 52, determination unit 54, standardization unit 56, concealment unit 58, event sending unit 60, anomaly receiving unit 62, and monitoring unit 64.

Information processing described in the programs is read into the computer 1900 to function as the acquisition unit 52, determination unit 54, standardization unit 56, concealment unit 58, event sending unit 60, anomaly receiving unit 62, and monitoring unit 64, which are specific means realized through cooperation of software and the various hardware resources described above. These specific means then implement operation or modification of information according to an application of the computing system 10 in the present embodiment so that the analysis unit 50 specific to the application is built.

Programs that are installed on the computer 1900 and cause the computer 1900 to function as the analysis control unit 70 include an event receiving module, a correlation detecting module, and an anomaly sending module. These programs or modules operate on the CPU 2000 and the like to cause the computer 1900 to function as the event receiving unit 72, correlation detecting unit 74 and anomaly sending unit 76.

Information processing described in the programs is read into the computer 1900 to function as the event receiving unit 72, correlation detecting unit 74 and anomaly sending unit 76, which are specific means realized through cooperation of software and the various hardware resources described above. These specific means then implement operation or modification of information according to the application of the computing system 10 in the present embodiment so that the analysis control unit 70 specific to the application is built.

By way of example, when communication is performed between the computer 1900 and an external device or the like, the CPU 2000 executes a communication program loaded in the RAM 2020, and instructs the communication interface 2030 on communication processing in accordance with processing described in the communication program. The communication interface 2030 reads data for transmission stored in a send buffer area provided in a storage device, such as the RAM 2020, hard disk drive 2040, flexible disk 2090, or CD-ROM 2095, and sends the data to a network under control of the CPU 2000, or writes data received from the network in a receive buffer area provided in the storage device. Thus, the communication interface 2030 may transfer transmission/received data to the storage device by direct memory access (DMA), or alternatively, the CPU 2000 may read data from a source storage or the communication interface 2030 and writes the data into a destination communication interface 2030 or storage device, thereby transferring transmission/received data.

The CPU 2000 also reads all or only required data from a file or a database stored in an external storage device, such as the hard disk drive 2040, CD-ROM drive 2060 (CD-ROM 2095), flexible disk drive 2050 (flexible disk 2090), into the RAM 2020 by DMA transfer or the like and performs various processing on the data in the RAM 2020. The CPU 2000 then writes processed data back into the external storage device by DMA transfer or the like. Because the RAM 2020 can be considered to temporarily hold the contents of the external storage device during such a process, the present embodiment generically refers to the RAM 2020 and the external storage device or the like as memory, storage, or a storage device. Various programs and information such as data, tables, and databases in the present embodiment are stored in the storage device and subjected to information processing. The CPU 2000 may also hold part of data from the RAM 2020 in cache memory and perform data read and write in the cache memory. Because cache memory is responsible for some of functions of the RAM 2020 also in such an arrangement, the present embodiment assumes that cache memory is also included in the RAM 2020, memory, and/or a storage device unless it is specifically differentiated.

The CPU 2000 also performs various kinds of processing, including the various arithmetic operations, modification to information, conditional determination, information retrieval, and replacement described in the embodiment, which are specified by instruction lines in programs, on data read from the RAM 2020 and writes back the data into the RAM 2020. For example, when performing conditional determination, the CPU 2000 determines whether any of variables shown in the embodiment satisfies a certain condition, such as being greater, smaller, equal to or greater than, equal to or smaller than, or equal to another variable or a constant, and branches to a different instruction line or calls a subroutine if the condition holds (or does not hold).

The CPU 2000 also can search for information stored in a file or database within a storage device. For example, when a number of entries are stored in a storage device and in each of the entries the attribute value of a first attribute is associated with the attribute value of a second attribute, the CPU 2000 searches for an entry with the attribute value of the first attribute matching a specified condition from the entries in the storage device, and reads the attribute value of the second attribute stored in that entry, thereby obtaining the attribute value of the second attribute associated with the first attribute that satisfies the condition.

The programs or modules may be stored in an external recording medium, which may be the flexible disk 2090, CD-ROM 2095, or an optical recording medium such as a DVD and CD, a magneto-optical recording medium such as an MO, a tape medium, or semiconductor memory such as an IC card. Alternatively, a storage device, such as a hard disk or RAM, provided in a server system connected to a dedicated communication network or the Internet may be used as the recording medium, and the programs can be provided to the computer 1900 over the network.

While the present invention has been described with reference to its embodiment, the technical scope of the invention is not limited to the scope set forth in the embodiment. It will be apparent to those skilled in the art that various modifications or improvements may be made to the embodiment. It is apparent from descriptions in Claims that embodiments with such modifications or improvements can be encompassed within the technical scope of the invention.

It should be noted that the order of executing processes, such as actions, procedures, steps, and phases in the devices, system, programs, and method set forth in the Claims, specification, and drawings may be performed in any order unless specifically stated as "before", "prior to", or the like, and unless output from the preceding process is used in the subsequent process. "First", "then" or the like, even if used in relation to a process flow in the Claims, specification, and drawings for convenience, do not mean that execution in the described order is essential.

DESCRIPTION OF SYMBOLS 10 computing system
20 control system
30 analysis device
40 network
50 analysis unit
52 acquisition unit
54 determination unit
56 standardization unit
58 concealment unit
60 event sending unit
62 anomaly receiving unit
64 monitoring unit
70 analysis control unit
72 event receiving unit
74 correlation detecting unit
76 anomaly sending unit
1900 computer
2000 CPU
2010 ROM
2020 RAM
2030 communication interface
2040 hard disk drive
2050 flexible disk drive
2060 CD-ROM drive
2070 input/output chip
2075 graphics controller
2080 display device
2082 host controller
2084 input/output controller
2090 flexible disk
2095 CD-ROM

The invention claimed is:

1. An anomaly detection system for detecting an anomaly in a plurality of control systems, the anomaly detection system comprising:
a plurality of analysis devices that are associated with the respective control systems and that acquire an event occurring in an associated control system and analyze the event to determine whether there is an anomaly, wherein;
a first analysis device among the plurality of analysis devices determines whether an event occurring in the associated control system is to be indicated to a second analysis device among the plurality of analysis devices; and
the second analysis device determines that there is an anomaly on condition that the event indicated by the first analysis device has correlation with an event indicated by an analysis device other than the first analysis device.

2. The anomaly detection system according to claim 1, wherein each of the plurality of analysis devices comprises a standardization unit that converts a data format for an event occurring in the associated control system into a data format for the second analysis device, thereby standardizing the event.

3. The anomaly detection system according to claim 2, wherein the standardization unit of the first analysis device converts the data format for an event occurring in the associated control system into a standard data format for the plurality of control systems, thereby standardizing the event.

4. The anomaly detection system according to claim 1, wherein each of the plurality of analysis devices comprises a concealment unit that conceals a portion of data describing an event occurring in the associated control system.

5. The anomaly detection system according to claim 4, wherein
the concealment unit of the first analysis device stores a conversion table that shows correspondence between unconcealed data and concealed data,
the second analysis device provides the first analysis device with anomaly information including concealed data included in a concealed event received from the first analysis device when the second analysis device determines that there is an anomaly; and
the concealment unit of the first analysis device converts the concealed data included in the anomaly information provided by the second analysis device into unconcealed data with reference to the conversion table, and identifies the anomaly that occurred in the associated control system.

6. The anomaly detection system according to claim 4, wherein the second analysis device requests the first analysis device to indicate an unconcealed event if an event indicated by the first analysis device has correlation with an event indicated by an analysis device other than the first analysis device, receives an unconcealed event from the first analysis device, and determines that there is an anomaly on condition that the unconcealed event indicated by the first analysis device has correlation with the event indicated by the analysis device other than the first analysis device.

7. The anomaly detection system according to claim 1, wherein;
the second analysis device indicates an anomaly to at least some of the plurality of analysis devices, and
at least one of the plurality of analysis devices to which the anomaly has been indicated increase a frequency of monitoring the associated control system.

8. The anomaly detection system according to claim 1, wherein the first analysis device dynamically changes an analysis device that is selected as the second analysis device from among the plurality of analysis devices.

9. The anomaly detection system according to claim 8, wherein the first analysis device selects a new second analysis device after event indication to a same second analysis device has continued for a certain period or longer.

10. The anomaly detection system according to claim 8, wherein the first analysis device gives a higher priority to an analysis device with a short response time when selecting the second analysis device from the plurality of analysis devices.

11. The anomaly detection system according to any one of claims 1, wherein;
the first analysis device comprises an analysis unit that acquires events occurring in the associated control system and analyzes the events to determine whether the control system has an anomaly, the second analysis device comprises an analysis control unit that determines whether any of the plurality of control systems has an anomaly, the analysis unit of the first analysis device acquires an event occurring in the associated control system and determines whether or not to indicate the event to the second analysis device, and transfers the event to the analysis control unit of the second analysis device if the analysis unit determines that the event is to be indicated to the second analysis device, the analysis control unit of the second analysis device detects correlation between events from a plurality of first analysis devices, and determines that there is an anomaly on condition that the events has correlation, and indicates the anomaly to the analysis unit of the first analysis device if the analysis control unit determines that there is an anomaly, and the analysis unit of the first analysis device reports the anomaly indicated by the second analysis device to an administrator of the associated control system.

12. The anomaly detection system according to any one of claims 1, wherein;

the second analysis device indicates an anomaly to the first analysis device if the second analysis device determines that there is an anomaly, and the first analysis device reports the anomaly indicated by the second analysis device to the administrator of the control system.

13. The anomaly detection system according to any one of claims 1, wherein the second analysis device determines that there is an anomaly on condition that a change in events indicated by the first analysis device has correlation with a change in events indicated by an analysis device other than the first analysis device.

14. An anomaly detecting method for detecting an anomaly in a plurality of control systems, comprising:

providing a plurality of analysis devices, wherein the plurality of analysis devices are associated with the respective control systems and that acquire an event occurring in an associated control system and analyze the event to determine whether there is an anomaly, the method comprising:

determining, by a first analysis device among the plurality of analysis devices, whether an event occurring in the associated control system is to be indicated to a second analysis device among the plurality of analysis devices; and determining by the second analysis device that there is an anomaly on condition that the event indicated by the first analysis device has correlation with an event indicated by an analysis device other than the first analysis device.

* * * * *